(12) United States Patent
Sbongk

(10) Patent No.: US 11,560,918 B2
(45) Date of Patent: Jan. 24, 2023

(54) SYSTEM INCLUDING A COMPONENT AND A FASTENING DEVICE

(71) Applicant: ILLINOIS TOOL WORKS INC., Glenview, IL (US)

(72) Inventor: Albert Sbongk, Niederstetten (DE)

(73) Assignee: ILLINOIS TOOL WORKS INC., Glenview, IL (US)

(*) Notice: Subject to any disclaimer, the term of this patent is extended or adjusted under 35 U.S.C. 154(b) by 1095 days.

(21) Appl. No.: 16/303,876

(22) PCT Filed: May 17, 2017

(86) PCT No.: PCT/US2017/033011
§ 371 (c)(1),
(2) Date: Nov. 21, 2018

(87) PCT Pub. No.: WO2017/205126
PCT Pub. Date: Nov. 30, 2017

(65) Prior Publication Data
US 2020/0240454 A1   Jul. 30, 2020

(30) Foreign Application Priority Data
May 24, 2016   (DE) .................... 10 2016 109 499.4

(51) Int. Cl.
F16B 27/00   (2006.01)
F16B 37/08   (2006.01)
F16B 5/02    (2006.01)

(52) U.S. Cl.
CPC .......... *F16B 37/0842* (2013.01); *F16B 5/025* (2013.01)

(58) Field of Classification Search
CPC .............................. F16B 37/0842; F16B 5/025
(Continued)

(56) References Cited

U.S. PATENT DOCUMENTS 2,429,833 A * 10/1947 Luce ...................... F16B 5/025
411/84
4,545,697 A * 10/1985 Verdenne .............. F16B 37/044
403/252
(Continued)

FOREIGN PATENT DOCUMENTS

CN   106605070 A   4/2017
DE   202015103586 U1   8/2015
(Continued)

OTHER PUBLICATIONS

PCT, International Search Report and Written Opinion, International Application No. PCT/US2017/033011; dated Jul. 14, 2017, 8 pages.

*Primary Examiner* — Gary W Estremsky
(74) *Attorney, Agent, or Firm* — Thompson Hine LLP

(57) ABSTRACT

A system for fastening a component on a fastening projection. A fastening device has a fastening element with a holding receptacle with holding means to hold the fastening projection and positive-locking elements. The component or an intermediate element arranged on the component has corresponding positive-locking elements. Prestressing means prestress the mutually corresponding positive-locking elements into positive engagement in a premounted position of the fastening element on the component so that lateral displacement of the fastening element relative to the component along a first direction of movement is prevented. The holding receptacle has a centering opening at least partially tapering in the insertion direction of the fastening projection so that the fastening projection is centered with respect to the holding receptacle of the fastening element with temporary suppression of positive locking of the mutu-
(Continued)

ally corresponding positive-locking elements and with lateral displacement of the fastening element along the first direction.

21 Claims, 9 Drawing Sheets

(58) Field of Classification Search
USPC .......................................................... 411/85
See application file for complete search history.

(56) References Cited

U.S. PATENT DOCUMENTS

| | | | | |
|---|---|---|---|---|
| 4,575,295 A * | 3/1986 | Rebentisch | ........... | F16B 37/046 411/85 |
| 4,917,553 A * | 4/1990 | Muller | ................. | F16B 37/046 411/85 |
| 5,028,189 A * | 7/1991 | Harley | ................. | A47B 88/956 411/113 |
| 5,137,406 A * | 8/1992 | Cosenza | ................. | F16B 2/005 411/113 |
| 5,271,586 A * | 12/1993 | Schmidt | ................ | F16B 37/046 248/68.1 |
| 5,489,173 A * | 2/1996 | Hofle | .................... | F16B 37/046 411/85 |
| 5,893,538 A * | 4/1999 | Onishi | .................. | F16L 3/2431 248/65 |
| 7,044,701 B2 * | 5/2006 | Herb | ..................... | F16B 37/046 411/84 |
| 8,651,786 B2 * | 2/2014 | Merhar | ................. | F16B 37/046 411/84 |
| 9,194,418 B2 * | 11/2015 | Parthibhan | ............ | F16B 37/046 |
| 10,105,835 B1 * | 10/2018 | Kao | ....................... | A47F 5/0853 |
| 2013/0177366 A1 * | 7/2013 | Whipple | ............... | F16B 37/045 411/172 |
| 2014/0010616 A1 * | 1/2014 | Meine | ..................... | F16B 7/187 411/190 |
| 2016/0111995 A1 * | 4/2016 | Nayar | ..................... | F24S 25/10 211/41.1 |
| 2017/0175800 A1 * | 6/2017 | Nehls | ...................... | F16B 43/00 |
| 2020/0116191 A1 * | 4/2020 | Uppu | ..................... | H02S 20/00 |

FOREIGN PATENT DOCUMENTS

| | | |
|---|---|---|
| EP | 3191719 A1 | 7/2017 |
| FR | 2616474 | 12/1988 |
| WO | WO 2013127638 | 9/2013 |
| WO | WO 2015065583 | 5/2015 |

* cited by examiner

SYSTEM INCLUDING A COMPONENT AND A FASTENING DEVICE

The invention relates to a system utilizing a component and a fastening device for fastening the component on a fastening projection of a carrier component, wherein the fastening device comprises a fastening element with a holding receptacle for the fastening projection, and wherein the holding receptacle has holding means which are designed to hold the fastening projection, which is guided through a hole in the component, in the holding receptacle.

A system of said type is known for example from WO 2015/065583 A1. Said system, while being simple to assemble, offers a high holding force during operation. Such systems are commonly used for fastening components on carrier components of automobiles. The carrier components may for example be body sections of the automobile. Components may for example be electronic components, such as electronic control units. These exist in different sizes and are generally fastened to the carrier component by means of multiple fixing points. For this purpose, the carrier component correspondingly has multiple fastening projections which are guided through in each case one hole in the component and are then fixed by means of a fastening device of the type mentioned in the introduction.

In the case of multiple fastening points being provided for a component, a problem exists if the fastening points, in particular the fastening projections provided on the carrier component, exhibit position tolerances. Therefore, fastening devices have already been proposed which have curved, elastic plastics arms which, within certain limits, can compensate a position tolerance of the fastening projection. A disadvantage here is however the fact that the holding force during operation is reduced.

Taking the discussed prior art as a starting point, it is therefore the object of the invention to provide a system of the type mentioned in the introduction which, while being simple to assemble and providing high holding forces during operation, can compensate position tolerances of fastening projections on a carrier component.

The invention achieves the object by means of the subject matter of independent claim 1. Advantageous refinements can be found in the dependent claims, in the description and in the figures.

For a system of the type mentioned in the introduction, the invention achieves the object in that the fastening element has positive-locking elements, wherein the component or an intermediate element arranged on the component has positive-locking elements corresponding to the positive-locking elements of the fastening element, in that prestressing means are provided which prestress the mutually corresponding positive-locking elements into positive engagement in a premounted position of the fastening element on the component, with the result that a lateral displacement of the fastening element relative to the component along a first direction of movement is prevented, and in that the holding receptacle of the fastening element has a centering opening at least partially tapering in the insertion direction of the fastening projection, against which centering opening the fastening projection of the carrier component strikes during the course of insertion into the holding receptacle, and by means of which centering opening the fastening projection is centered with respect to the holding receptacle of the fastening element with temporary suppression of the positive locking of the mutually corresponding positive-locking elements and with lateral displacement of the fastening element along the first direction of movement.

The carrier component may be a carrier component of a vehicle, in particular of an automobile. Accordingly, the carrier component may for example be a body part of the automobile. The component may for example be an electronic component, such as an electronic control unit. That portion of the component which has the hole(s) for the leadthrough of the fastening projection may be of plate-like or flange-like form. The component may in particular comprise multiple holes, wherein then, multiple fastening projections are correspondingly arranged on the carrier component, which fastening projections are guided through in each case one of the holes. The system according to the invention may then correspondingly comprise multiple fastening devices according to the invention with multiple fastening parts for fastening on the fastening projections.

The fastening projection may be a fastening bolt. This may be a threaded bolt with an external thread, or a grooved bolt. The fastening projection may have a cylindrical shape, or may be at least partially of spherical form. It may be integrally connected to the carrier component or fastened to said carrier component, for example by adhesive bonding or welding. The fastening element has a holding receptacle for the fastening projection. The holding receptacle in turn has holding means, for example latching means, for holding the fastening projection, which is guided through the hole in the component to be fastened on the carrier component, in the holding receptacle.

According to the invention, the fastening element and the component, or possibly an intermediate element arranged on the component, have positive-locking elements which correspond to one another. Using prestressing means, the corresponding positive-locking elements are held in positive engagement, and thus the fastening part and the component, or possibly the intermediate element arranged on the component, are held on one another in a premounted position before the fastening projection is inserted through the hole in the component into the holding receptacle of the fastening part. The positive engagement of the positive-locking elements prevents a lateral movement of the fastening element relative to the component or the intermediate element along a first direction of movement. The relative position between component and fastening element is thus secured in the premounted position. As mentioned, that portion of the component which has the hole for the leadthrough of the fastening projection may be of plate-like or flange-like form. In this context, a lateral displacement means a displacement perpendicular to the longitudinal axis of the hole.

According to the invention, the entrance into the holding receptacle of the fastening element is formed by a centering opening at least partially tapering in the insertion direction of the fastening projection. Here, the insertion direction runs in the direction of the longitudinal axis of the holding receptacle or of a for example cylindrical fastening projection. For example, the centering opening may taper in a V shape in cross section. If the fastening projection, as viewed in the first direction of movement, is not aligned centrally relative to the holding receptacle of the fastening element, the fastening projection abuts against the tapering surface of the centering opening. During the course of the further insertion of the fastening projection, the latter slides along the tapering surface of the centering opening until, as viewed in the first direction of movement, said fastening projection is aligned centrally relative to the centering opening and thus relative to the holding receptacle. During this process, the fastening element is displaced laterally along the first direction of movement. This is made possible in that, as a result of the sliding-in of the fastening projection, in particular the striking against the tapering surface of the centering opening, the positive locking between the fastening element and the component or the intermediate element is suppressed. Only as a result of this is the lateral displacement of the fastening element for the centering of the fastening projection at least in the first direction of movement made possible.

Where, in this context, centering of the fastening projection relative to the holding receptacle is referred to, this means an alignment between holding receptacle and fastening projection by means of a relative movement between the fastening projection and the fastening element along the respective direction of movement. Where, in this context, a movement along a direction of movement is referred to, this may basically comprise a forward movement and a backward movement along said direction of movement.

The degree of the tapering of the centering opening required for the centering according to the invention is dependent in particular on the size and shape of the fastening projection. For example, if the fastening projection is a cylindrical threaded bolt, a more pronounced tapering, or a larger tapering surface of the centering opening, is necessary in order to ensure the centering according to the invention. If, by contrast, the fastening projection is for example a spherical bolt, a less pronounced tapering, or a smaller tapering surface of the centering opening, for example merely a slight bevel of the centering opening, may suffice.

The invention permits, in a simple manner, an automatic central alignment of the fastening projection relative to the holding receptacle of the fastening element along the axis of the first direction of movement. The positive-locking elements ensure that a movement along the first direction of movement is possible only when, as a result of the insertion of the fastening projection into the holding receptacle, in particular the interaction of the fastening projection with the conically tapering centering opening, the positive locking is suppressed. Otherwise, such a displacement of the fastening element is reliably prevented by the positive-locking elements. Thus, a defined position of the fastening element and thus of the fastening device is ensured at all times, and at the same time, a high holding force during operation is ensured.

With the fastening projection accommodated in the holding receptacle, in particular with the fastening projection completely accommodated in the holding receptacle, the corresponding positive-locking elements can be placed in positive engagement again by virtue of the prestressing means. As soon as the fastening projection is centered relative to the holding receptacle, that is to say in particular when the fastening projection has moved past the conical tapering of the centering opening, the prestressing means can place the positive-locking means of fastening part and component or intermediate element in engagement again, such that, after the centering, a further (undesired) displacement of the fastening element in the first direction of movement is again prevented by the positive locking.

In a further refinement, it may be provided that, as a result of the interaction of the fastening projection with the centering opening of the holding receptacle, the fastening element is lifted from the component and consequently the positive locking of the mutually corresponding positive-locking elements is suppressed. In this refinement, during the course of the striking against the conically tapering surface of the centering opening, the fastening projection pushes the fastening element upward and thus lifts the fastening element from the component. As a result, the positive-locking elements pass out of engagement. After the centering has taken place, the fastening element is pushed downward again by the prestressing means until the positive-locking elements are in engagement with one another again.

In a particularly practical refinement, the mutually corresponding positive-locking elements may be formed by a toothing of the fastening element and a toothing of the component or of the intermediate element arranged on the component.

In a further refinement, it may be provided that the fastening element has, on its underside facing the component, at least one teeth row with a plurality of teeth as a toothing, and that the component or the intermediate element arranged on the component has, on its upper side facing the fastening element, likewise at least one teeth row with a plurality of teeth as a toothing, wherein the teeth rows of the fastening element and of the component or of the intermediate element arranged on the component can come into positive engagement with one another in different positions along the first direction of movement. For example, the fastening element may have, on its underside, two parallel teeth rows. The component or the intermediate element then correspondingly has, on its upper side, two corresponding parallel teeth rows. The teeth rows have in each case a multiplicity of teeth which are aligned parallel, in particular perpendicular to the longitudinal axis of the teeth rows. Said teeth form different defined positions between fastening element and component or intermediate element along the first movement direction.

In an alternative refinement, it may be provided that the fastening element has at least two elastic teeth arms with at least one tooth arranged on each end thereof as a toothing, and that the component or the intermediate element arranged on the component has at least two teeth rows with a plurality of teeth as a toothing, wherein, with elastic deformation of the teeth arms, the teeth of the elastic teeth arms can come into positive engagement with in each case one of the teeth rows in different positions along the first direction of movement, wherein the elastic teeth arms are prestressed in the direction of the teeth row respectively assigned to them. The elastic teeth arms thus themselves form the prestressing means for prestressing the positive-locking elements into positive engagement with one another. A lateral displacement of the fastening element caused by the insertion of the fastening projection into the holding receptacle, and the associated interaction with the centering surface, causes the teeth arms to be released, with elastic deformation counter to their prestress, from the positive engagement with the respective teeth row. In the end position of the fastening element, the teeth of the teeth arms then come into positive engagement again with the respective teeth row, in particular with a different tooth of the teeth row.

It is furthermore possible for arresting means to be provided which prevent a movement of the fastening element relative to the component or to the intermediate element arranged on the component in another direction than along the first direction of movement. The arresting means may be formed by collar portions of the fastening element and of the component or of the intermediate element arranged on the component, which collar portions are in engagement with one another. The collar portions likewise realize positive locking. By means of this refinement, it is ensured that the fastening element cannot be inadvertently moved in another direction than along the first movement direction or axis.

In a further refinement, the prestressing means may be formed by elastic holding arms which are formed on the fastening element and which press the mutually corresponding positive-locking elements into positive engagement with one another. The elastic holding arms are for example deflected out of their rest position counter to their preload as a result of a lifting of the fastening element from the component and the associated suppression of the positive locking of the positive-locking elements. If the fastening projection enters (in centered fashion) the holding receptacle, the holding arms push the fastening element downward again, and thus push the positive-locking elements into engagement again. In this way, particularly simple automatic release and restoration of the positive locking is achieved.

The holding means of the holding receptacle may comprise latching means which are designed to latch with corresponding latching means of the fastening projection. The latching means may for example be formed by an internal thread on the holding receptacle, which internal thread then latches with a corresponding external thread on the fastening projection.

In a further refinement, it may be provided that the fastening element comprises an at least partially elastic fastening part which is accommodated by a housing part in a mounted state, wherein the latching means for latching on the fastening projection are formed on an inner wall, which delimits the holding receptacle, of the fastening part and/or of the housing part, and wherein the fastening part and the housing part each have at least one force transmission surface, wherein the force transmission surfaces face one another in the mounted state and transmit at least one operationally occurring pulling force, wherein the force transmission surfaces each lie in planes which are oblique or curved with respect to the insertion direction of the holding receptacle. This refinement corresponds to the refinement known from WO 2015/065583 A1, with a fastening part and a housing part. The fastening part may for example be of bracket-shaped form, and is inserted into the housing part. Here, the fastening part and possibly the housing part jointly form the holding receptacle for the fastening projection, and for this purpose have suitable latching means, for example latching arms or an internal thread or grooves or the like. In this way, the fastening projection, for example a cylindrical fastening bolt can be particularly easily pushed into the holding receptacle, for example without a screw connection being necessary. The fastening part and the housing part have in each case one or more force transmission surfaces which interact during the operation of the fastening device. During operation, that is to say with the component fastened by means of the device to the carrier component, the force transmission surfaces transmit forces acting on the fastening device, for example pulling forces, pushing forces or the like. A pulling force which arises during operation and which is transmitted by the force transmission surfaces is in this case directed counter to the insertion direction of the fastening projection. A pushing force is correspondingly directed in the insertion direction of the fastening projection. Here, it is the case in particular that the force transmission surfaces are not involved in the latching of the fastening projection in the holding receptacle. In the mounted state of the device, the force transmission surfaces of the fastening part and of the housing part are in contact, or are at least so close to one another that, when forces arise during operation, said force transmission surfaces make contact and then transmit said forces. The force transmission surfaces of the fastening part and of the housing part lie in this case in planes which are oblique or curved relative to the insertion direction of the fastening projection. This arrangement of the force transmission surfaces has the effect that a pulling force that acts on the device during operation generates a force which acts radially inward, in relation to the holding receptacle, on the fastening part. Thus, when a pulling force arises, the fastening part is pressed radially inward against the fastening projection. The pulling force thus increases the holding force of the fastening device. In this way, it is possible, with acceptable mounting forces in relation to known fastening devices, to achieve an increased holding force during operation. To perform the abovementioned function, the fastening part is at least partially, in particular entirely, elastic. The fastening part and/or the housing part may in this case be composed of a plastic. In this regard, the fastening device may furthermore be designed as described in WO 2015/065583 A1.

The housing part may form a constituent part of the fastening element, wherein the positive-locking elements are formed on the housing part. Thus, the fastening element is then of two-part form, and comprises the housing part and the fastening part. It is however also possible for the housing part to form an (integral) constituent part of the component.

In a further particularly advantageous refinement, it may be provided that the positive-locking elements corresponding to the positive-locking elements of the fastening element are formed on an upper side, which faces the fastening element in the premounted position, of an intermediate element arranged on the component and having a hole for guiding through the fastening projection, that the intermediate element has further positive-locking elements on its underside facing away from the fastening element in the premounted position, wherein the component has, on its upper side facing the intermediate element, further positive-locking elements corresponding to the further positive-locking elements of the intermediate element, that further prestressing means are provided which prestress the mutually corresponding further positive-locking elements into positive engagement in a premounted position of the intermediate element on the component, with the result that a lateral displacement of the intermediate element relative to the component along a second direction of movement is prevented, and that the hole in the intermediate element has a further centering opening at least partially tapering in the insertion direction of the fastening projection, against which centering opening the fastening projection strikes in the course of insertion into the hole in the intermediate element, and by means of which centering opening the fastening projection is centered with respect to the holding receptacle of the fastening element with temporary suppression of the positive connection of the mutually corresponding further positive-locking elements and with lateral displacement of the intermediate element along the second direction of movement.

While the refinement discussed in the introduction permits in particular centering of the fastening projection, and thus corresponding tolerance compensation, along the first movement direction, that is to say in an axis, this refinement permits centering of the fastening projection, and thus corresponding tolerance compensation, additionally along a second movement direction, that is to say along two axes. For this purpose, further (second) positive-locking elements are arranged firstly on the intermediate element and secondly on the component, which positive-locking elements correspond to and interact with one another. Furthermore, further (second) prestressing means are provided which hold the further corresponding positive-locking elements in positive engagement and thus fix the intermediate element, which is arranged on the component, in a premounted position on the component before the fastening projection is inserted through the hole in the component and in the intermediate element into the holding receptacle of the fastening part. The positive engagement of the further positive-locking elements prevents a lateral movement of the intermediate element, and thus of the fastening element arranged thereon, relative to the component in a second direction of movement. The relative position between the component and the intermediate element is thus also secured in the premounted position. The relative position between the fastening element and the intermediate element is secured in the premounted position in any case, as discussed. The intermediate element is seated between the component and the fastening element. Said intermediate element likewise has a hole, in the same manner as the component. The fastening projection is inserted through the hole in the component and the hole in the fastening element into the holding receptacle of the fastening element. Here, the fastening projection firstly strikes the conically tapering further (second) centering opening of the intermediate element. For example, the further centering opening may also taper in a V shape in cross section. In this way, as discussed above with regard to the (first) centering opening of the holding receptacle, the positive engagement of the further positive-locking elements of component and intermediate element is suppressed counter to the further prestressing means. As a result, in turn, a movement of the intermediate element with the fastening element arranged thereon in particular immovably in said second movement direction is made possible. The interaction of the fastening projection with the conically tapering surface of the further centering opening results, as basically discussed above, in a movement of the intermediate element and thus of the fastening element now along the second movement direction, and thus in centering of the fastening projection until the fastening projection is aligned centrally relative to the holding receptacle with respect to the second lateral movement direction. The fastening projection strikes the centering opening of the holding receptacle only thereafter, and the centering of the fastening projection along the first movement direction occurs, as discussed above. Two-stage centering of the fastening projection is thus realized, firstly along the second movement direction and subsequently along the first movement direction. For this biaxial tolerance compensation, it is particularly advantageous if the second movement direction runs perpendicular to the first movement direction.

It may be provided that, when the fastening projection strikes the centering opening of the holding receptacle of the fastening element, the further corresponding positive-locking elements come into positive engagement again by virtue of the further prestressing means. As basically discussed above with regard to the (first) prestressing means, it is thus also the case with regard to the further (second) prestressing means that, after the centering of the fastening projection in the second movement direction, automatic and particularly simple restoration of the positive locking, and thus fixing of the position of the intermediate element, are realized. A further (undesired) displacement in the second movement direction is thus reliably prevented.

It may be provided that, as a result of the interaction of the fastening projection with the further centering opening of the intermediate element, the intermediate element is lifted jointly with the fastening element from the component and consequently the positive locking of the further mutually corresponding positive-locking elements is suppressed. Said lifting may basically be realized as discussed above with regard to the lifting of the fastening element. The fastening projection pushes the intermediate element upward, and thus lifts said intermediate element from the component, as a result of striking against the conically tapering surface of the further centering opening. As a result, the further positive-locking elements pass out of engagement. Subsequently, the intermediate element is pushed downward again by the further prestressing means until the further positive-locking elements are in engagement again.

In turn, it is possible in a particularly practical refinement for the further mutually corresponding positive-locking elements to be formed by a toothing of the intermediate element and a toothing of the component.

In a further refinement, it may be provided that the intermediate element has, on its underside facing the component, at least one teeth row with a plurality of teeth as a toothing, and that the component has, on its upper side facing the intermediate element, likewise at least one teeth row with a plurality of teeth as a toothing, wherein the teeth rows of the intermediate element and of the component can come into positive engagement with one another in different positions along the second direction of movement. The teeth rows may be designed as discussed above with regard to the (first) positive-locking elements. Thus, the intermediate element may for example have, on its underside, two parallel teeth rows. The component may then correspondingly have, on its top side, two corresponding parallel teeth rows. The teeth rows have in each case a multiplicity of parallel teeth aligned in particular perpendicular to the longitudinal axis of the teeth rows. Said teeth form different fixing positions between the component and the intermediate element in the second movement direction.

The longitudinal axes, which define the second movement direction, of the corresponding parallel teeth rows on component upper side and intermediate element underside may run perpendicular to the longitudinal axes, which define the first movement direction, of the corresponding parallel teeth rows on intermediate element upper side and fastening element underside.

In turn, further arresting means may be provided which prevent a movement of the intermediate element relative to the component in another direction than along the second direction of movement. The further arresting means may in turn be formed by collar portions of the intermediate element and of the component that are in engagement with one another.

In a further refinement, the further prestressing means may be formed by elastic holding arms which are formed on the component and which press the further mutually corresponding positive-locking elements into positive engagement with one another. The elastic holding arms are then for example deflected out of their rest position counter to their preload as a result of a lifting of the intermediate element from the component and the associated suppression of the positive locking of the further positive-locking elements. If the fastening projection enters (in centered fashion) the hole in the intermediate element, the holding arms push the intermediate element downward again, and thus push the further positive-locking elements into engagement again, in particular before the positive locking of the (first) corresponding positive-locking elements of fastening element and intermediate element is suppressed.

The system according to the invention may also comprise the carrier component.

Exemplary embodiments of the invention will be discussed in more detail below on the basis of figures, in which, in each case schematically:

Figure 1:
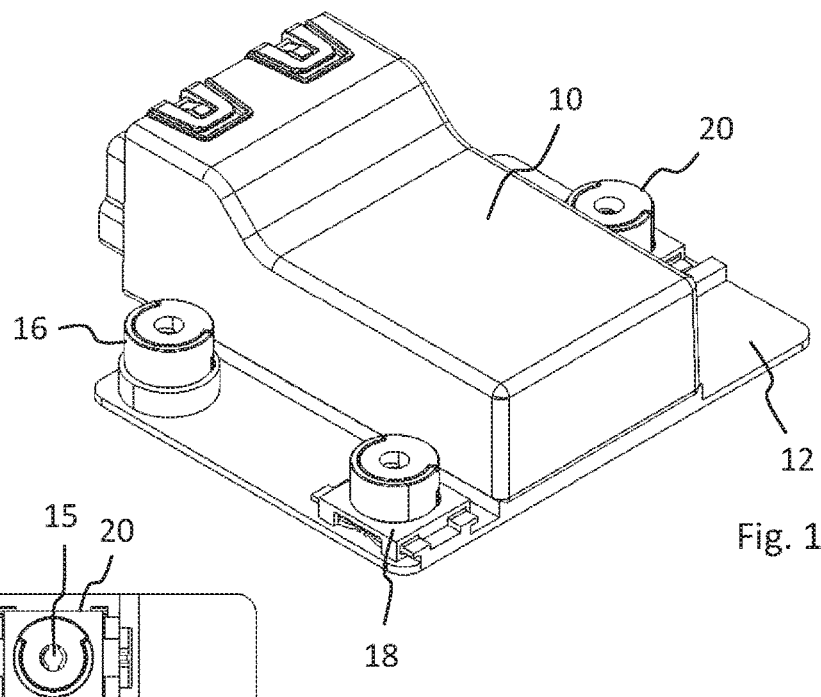
FIG. 1 shows a system according to the invention in a perspective view.
Figure 4:
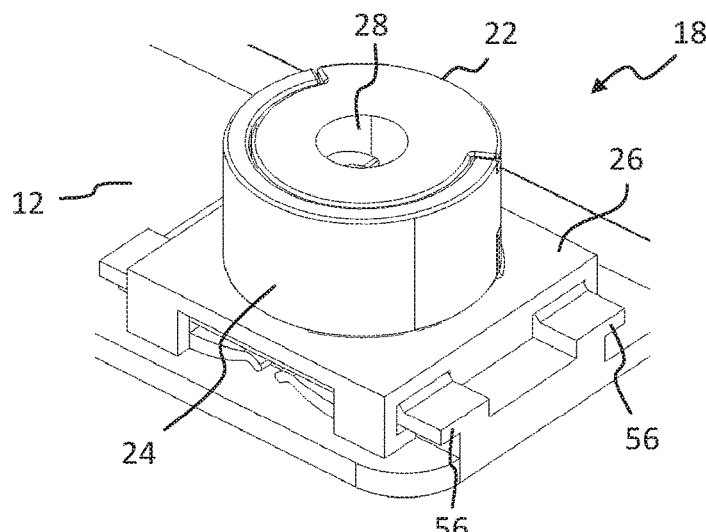
FIG. 4 shows a part of the system from FIG. 1 in a perspective view.
Figure 5:
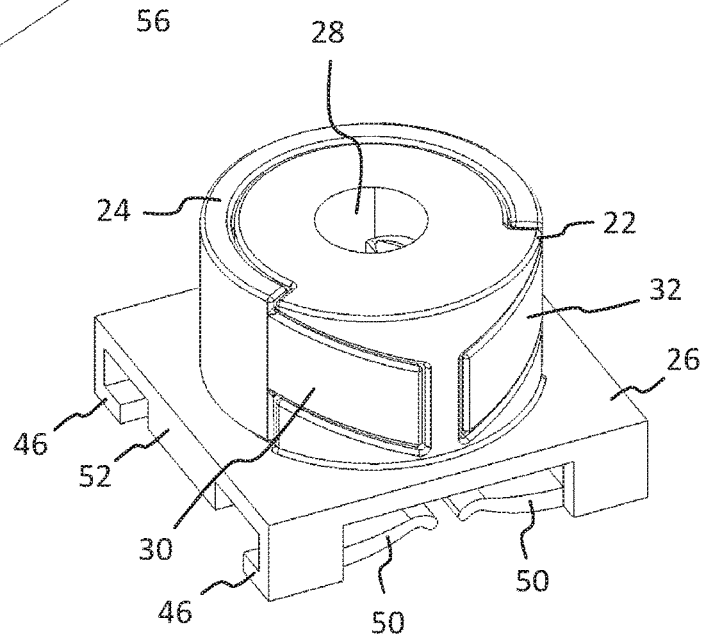
Figure 6:
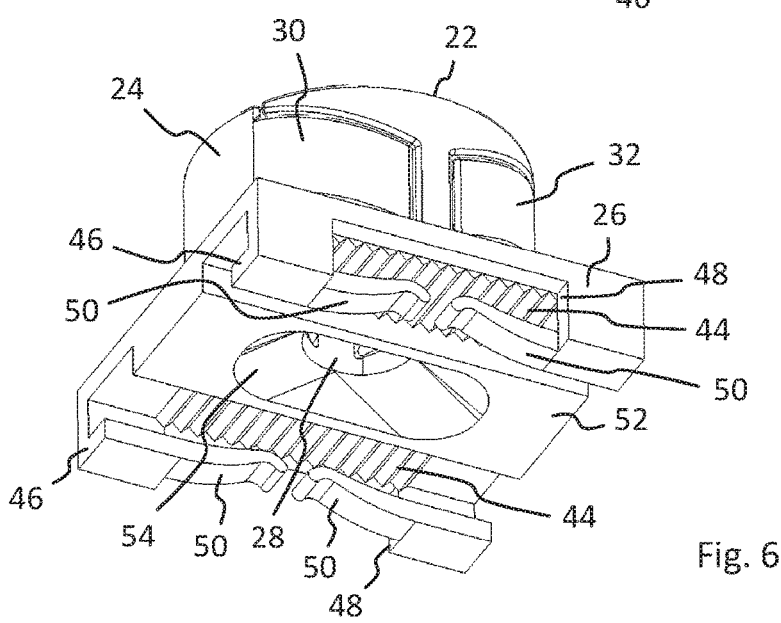
Figure 7:
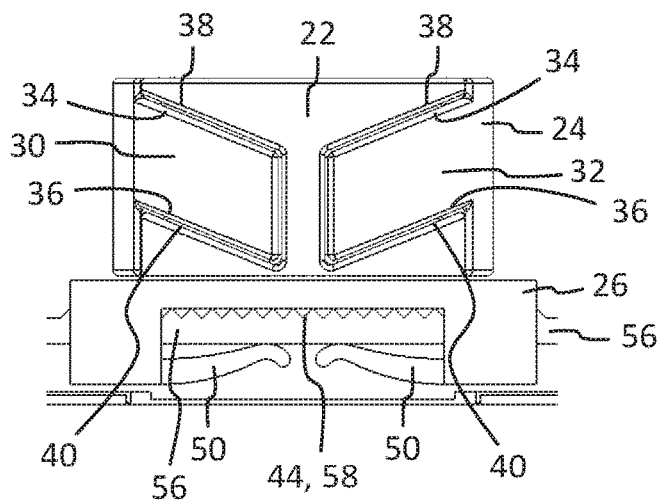
Figure 8:
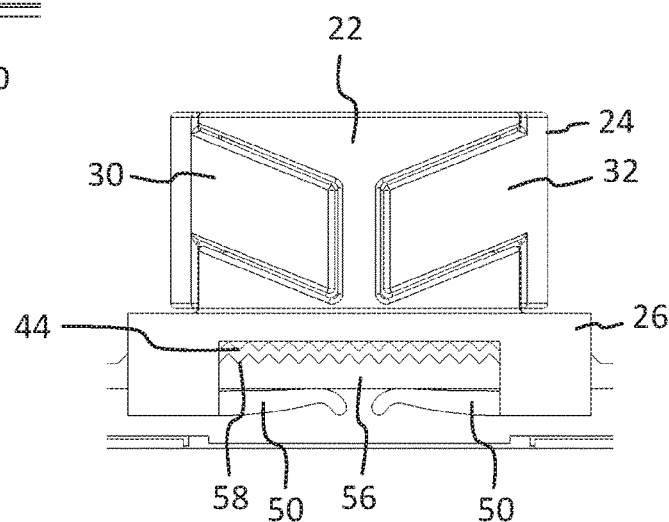
Figure 9:
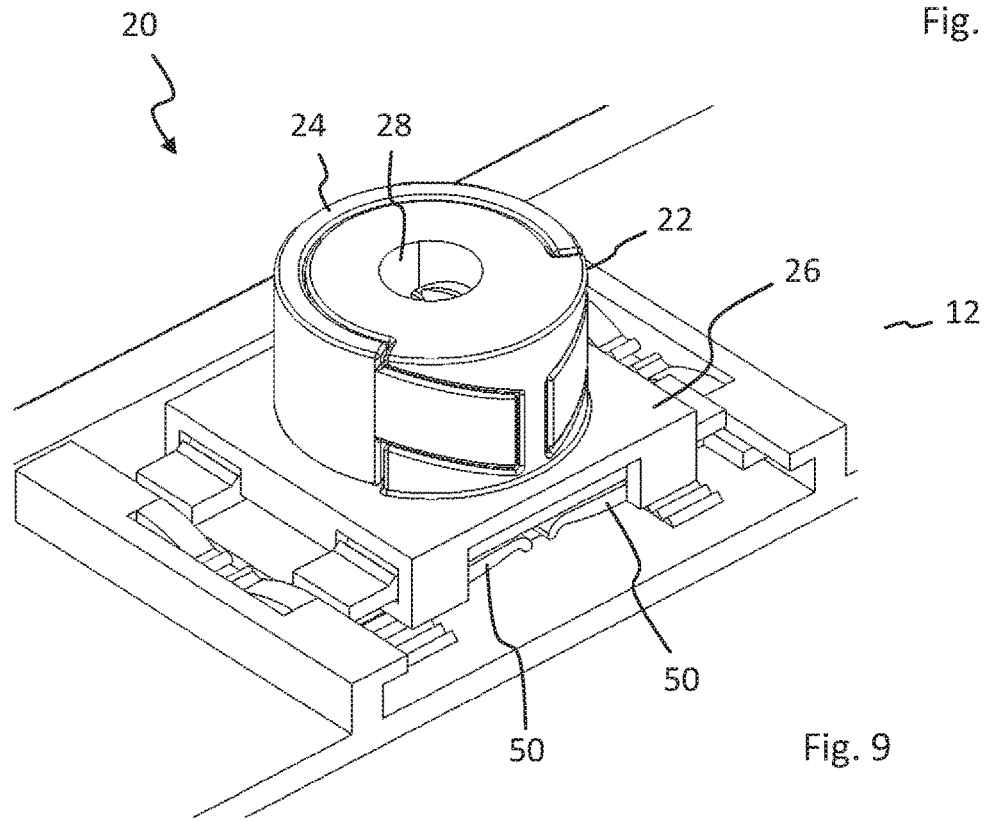
Figure 10:
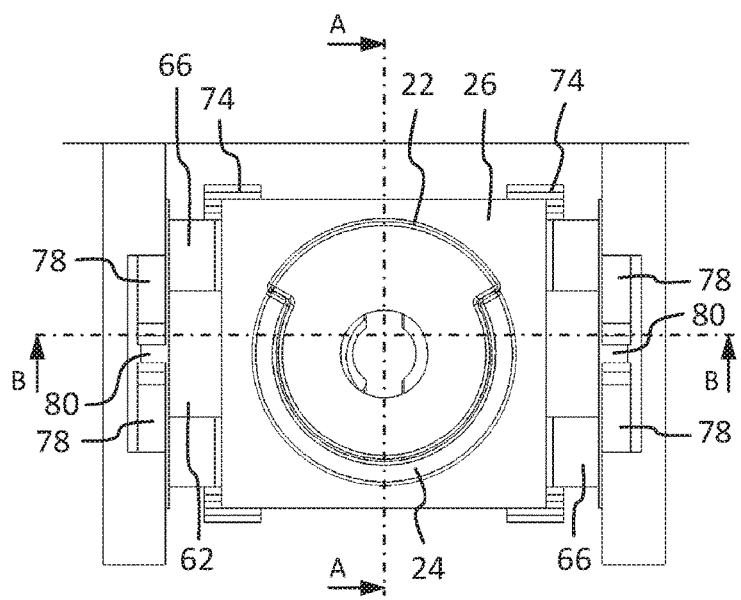
Figure 11:
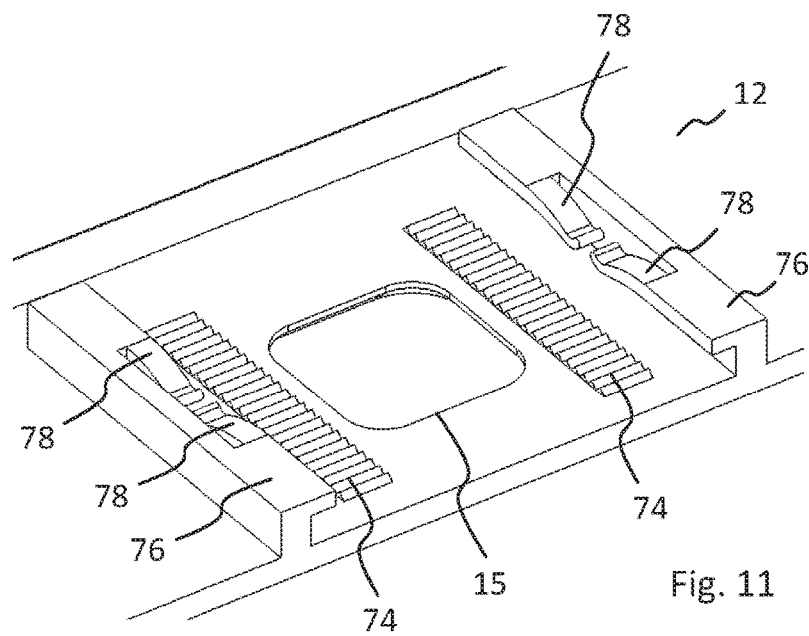
Figure 12:
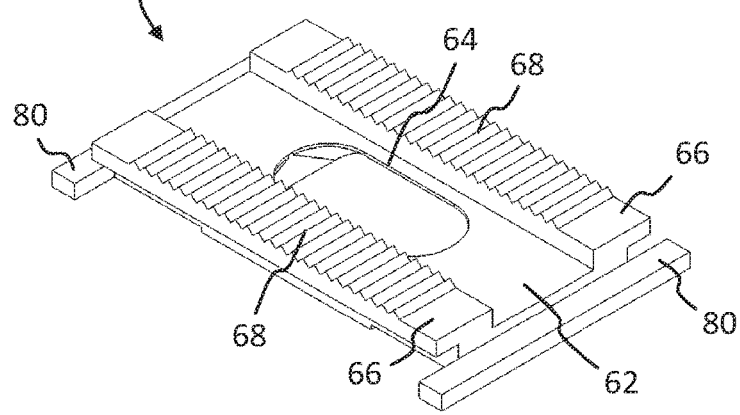
Figure 13:
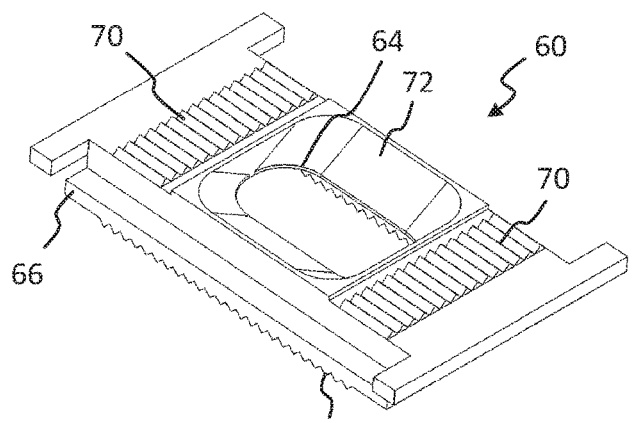
Figure 14:
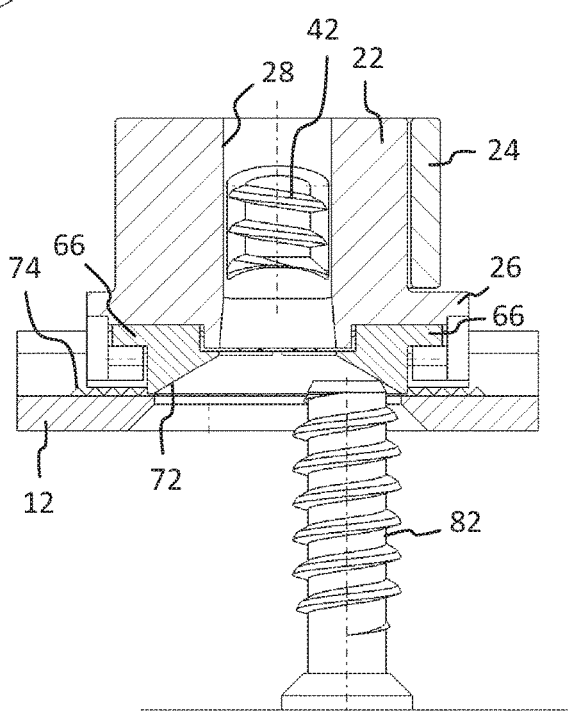
Figure 15:
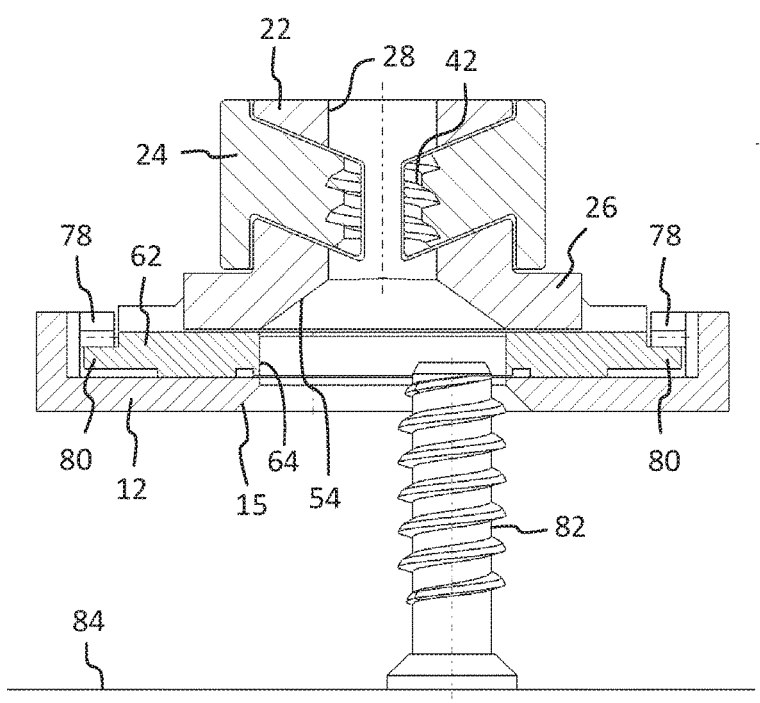
Figure 16:
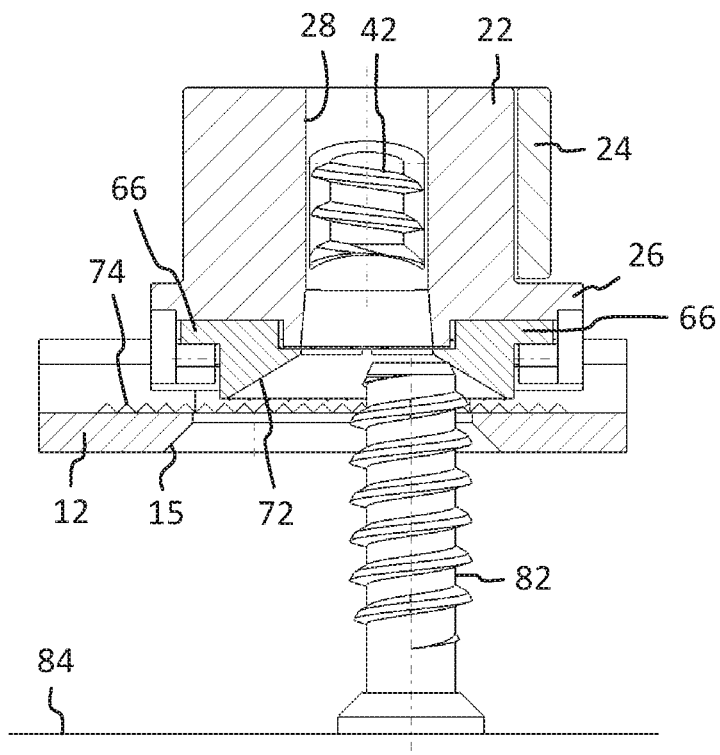
Figure 17:
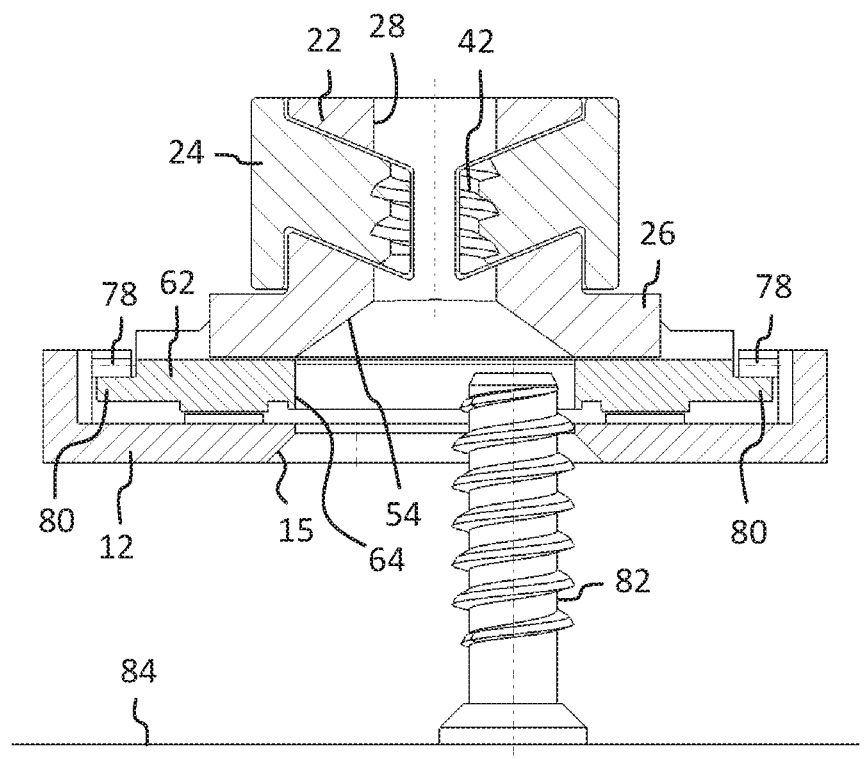
Figure 18:
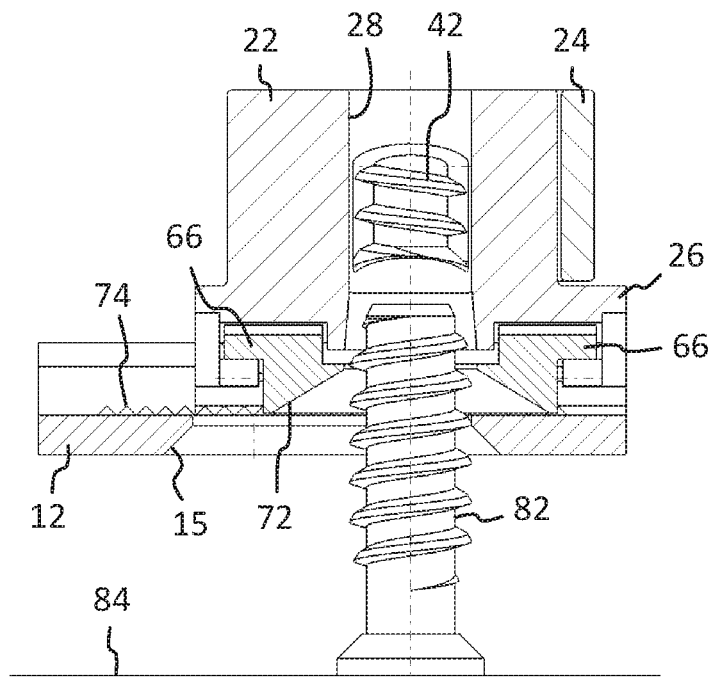
Figure 19:
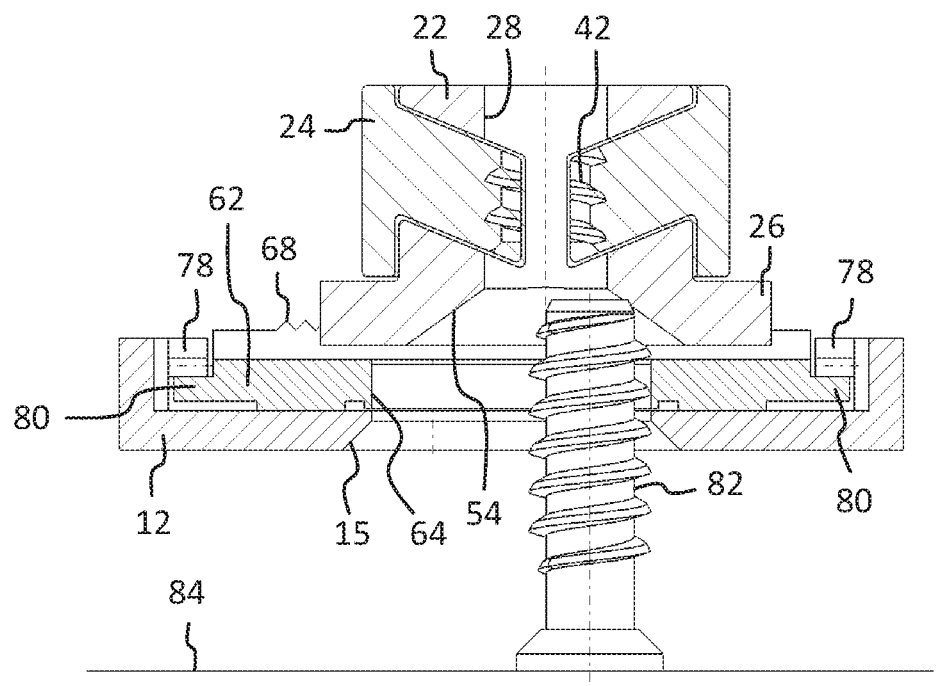
Figure 20:
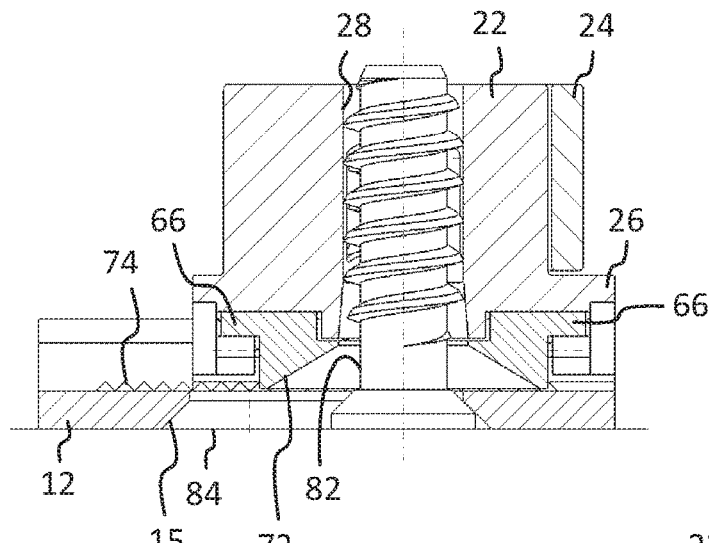
Figure 21:
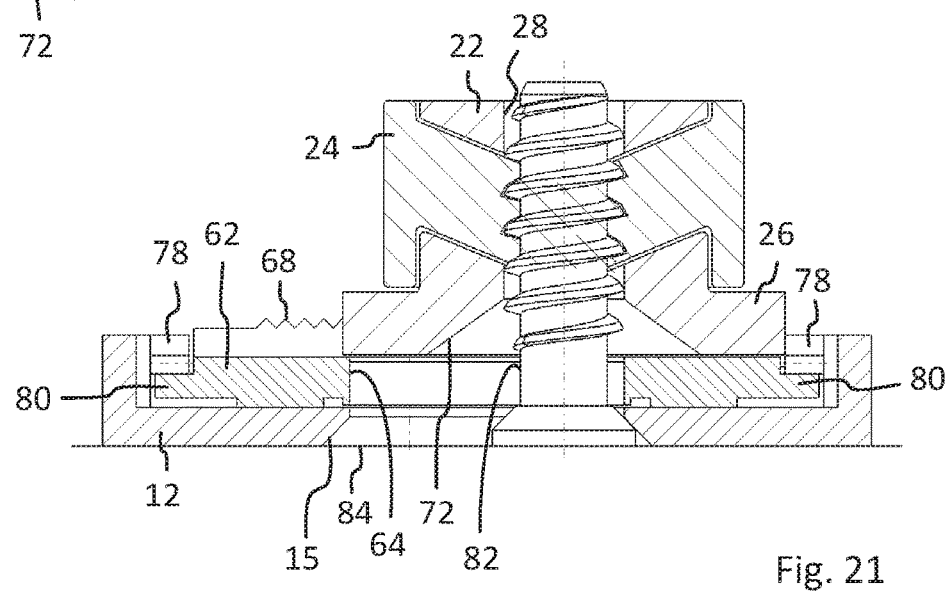
Figure 22:
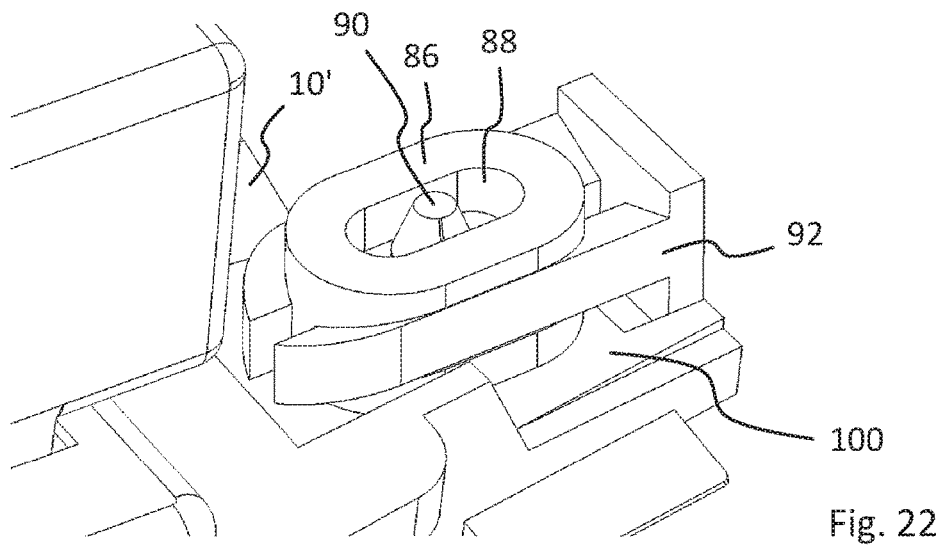
Figure 23:
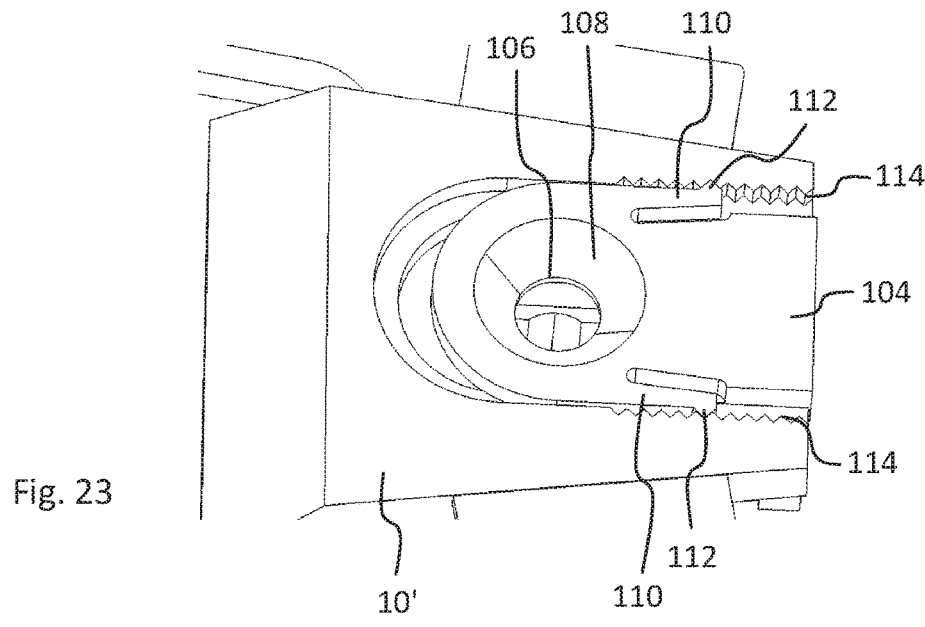
Figure 24:
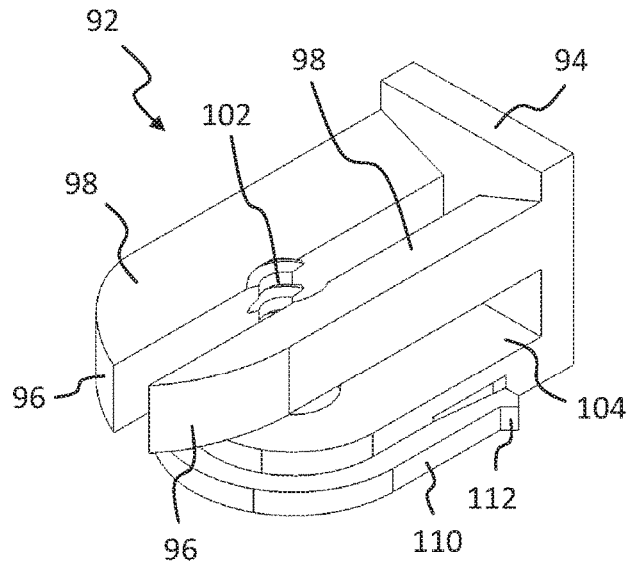
Figure 25:
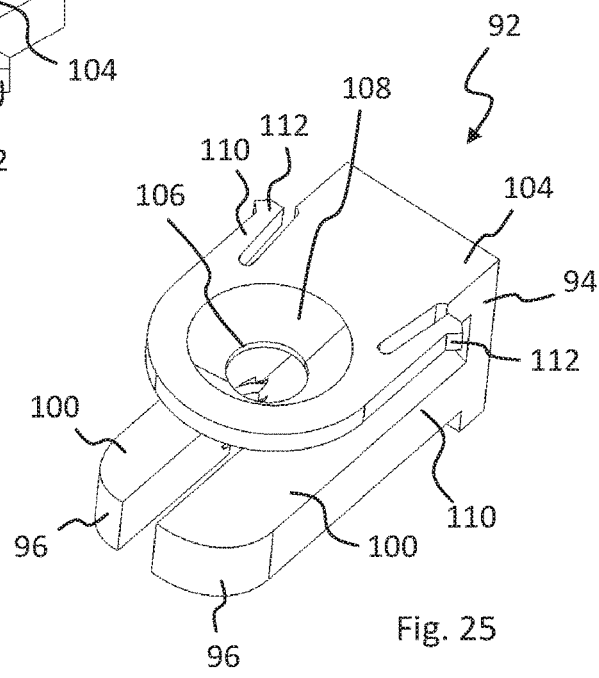

FIG. 5 shows a fastening element of the system shown in FIG. 4 in a first perspective view, FIG. 6 shows the fastening element from FIG. 5 in a second perspective view, FIG. 7 shows a side view of the detail shown in FIG. 4 in a first operating position, FIG. 8 shows the view from FIG. 7 in a second operating position, FIG. 9 shows a further detail of the system shown in FIG. 1 in a perspective view, FIG. 10 shows a plan view of the illustration from FIG. 9, FIG. 11 shows a part of the illustration from FIG. 9 in a perspective view, FIG. 12 shows an intermediate element of that part of the system according to the invention shown in FIG. 9, in a perspective view from above, FIG. 13 shows the intermediate element from FIG. 12 in a perspective view from below, FIG. 14 shows a sectional view along the line A-A in FIG. 10 in a first operating position of the system, FIG. 15 shows a sectional view along the line B-B in FIG. 10 in a first operating position of the system, FIG. 16 shows a sectional view along the line A-A in FIG. 10 in a second operating position of the system, FIG. 17 shows a sectional view along the line B-B in FIG. 10 in a second operating position of the system, FIG. 18 shows a sectional view along the line A-A in FIG. 10 in a third operating position of the system, FIG. 19 shows a sectional view along the line B-B in FIG. 10 in a third operating position of the system, FIG. 20 shows a sectional view along the line A-A in FIG. 10 in a fourth operating position of the system, FIG. 21 shows a sectional view along the line B-B in FIG. 10 in a fourth operating position of the system, FIG. 22 shows a detail of a system according to the invention according to a further exemplary embodiment in a first perspective view, FIG. 23 shows a detail view of the illustration from FIG. 22 in a second perspective view from below, FIG. 24 shows a part of the system shown in FIG. 22, in a first perspective view, and FIG. 25 shows the part from FIG. 24 in a second perspective view from below.

Unless stated otherwise, identical reference designations are used to denote identical items in the figures.

Figure 2:
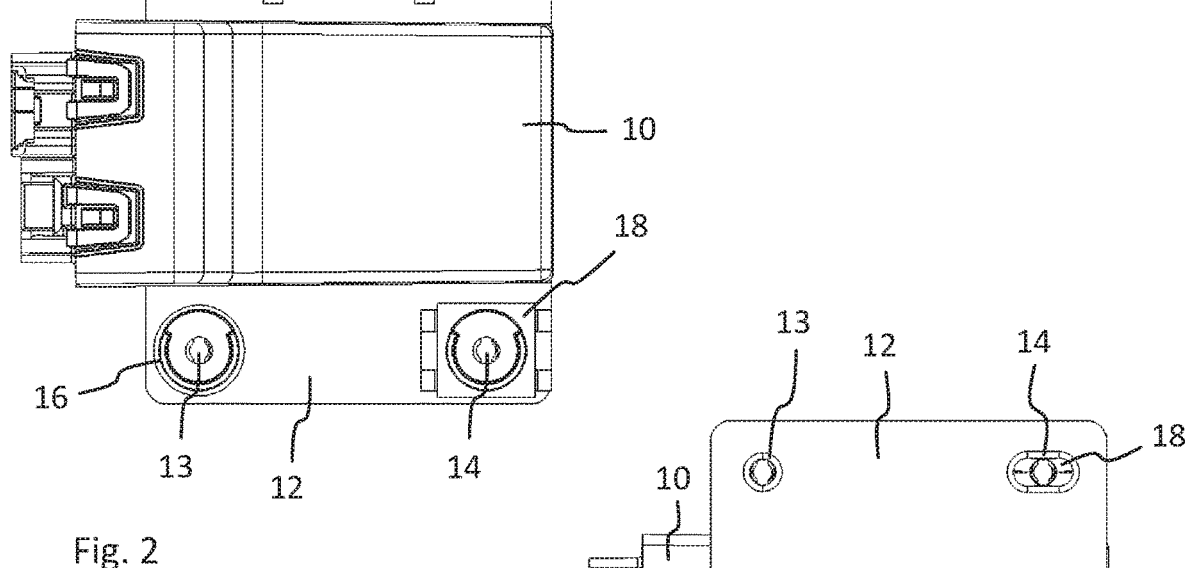
FIG. 2 shows the system from FIG. 1 in a plan view.
Figure 3:
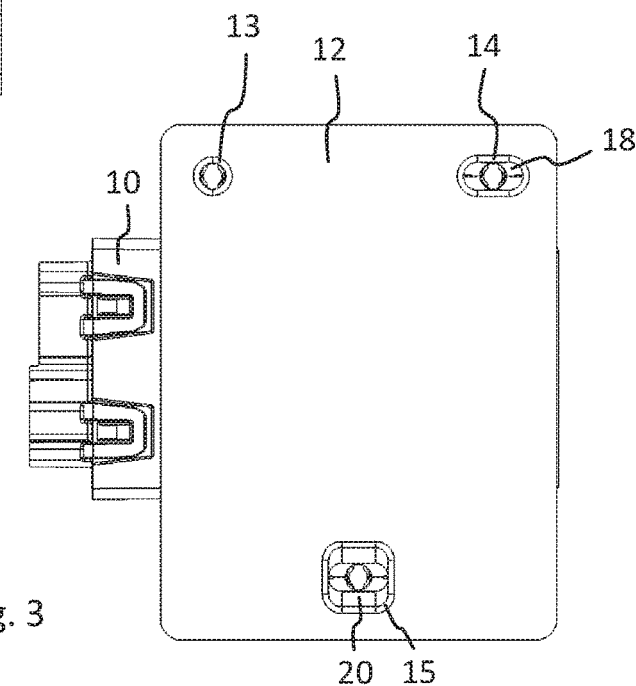
FIG. 3 shows the system from FIG. 1 in a view from below.

The system according to the invention shown in FIGS. 1 to 3 comprises a component 10, for example an electronic control unit of an automobile, which is to be fastened to a carrier component (not illustrated in any more detail in FIGS. 1 to 3), for example a carrier component of an automobile. The component 10 has a base plate 12 in which, in the present example, there are formed three holes 13, 14, 15. For fastening, three fastening projections, for example cylindrical fastening bolts, arranged on the carrier component are guided in a manner known per se through the holes 13, 14, 15 from the underside, shown in FIG. 3, of the component 10. The fastening projections guided through the holes 13, 14, 15 are held by means of fastening devices arranged on the upper side of the base plate 12, and the component 10 is thereby fastened to the carrier component.

In FIGS. 1 to 3, three different fastening devices are shown in a premounted position at the reference designations 16, 18, 20. The fastening device 16 may for example be designed as described in WO 2015/065583 A1. Said fastening device offers substantially no mobility and thus no tolerance compensation with regard to the position of the fastening projection which is to be guided through the hole 13 and fastened by means of the fastening device 16. The hole 13 is correspondingly circular and only slightly larger than the diameter of the for example cylindrical fastening projection (see FIG. 3). By contrast, the fastening devices 18 and 20 offer mobility and thus tolerance compensation with regard to the position of the fastening projection respectively to be fastened by them, as will be discussed in more detail below. Here, the fastening device 18 offers uniaxial tolerance compensation along one movement direction. The hole 14 assigned thereto in the base plate 12 correspondingly has the shape of a slot, the width of which is only slightly larger than the diameter of the for example cylindrical fastening bolt, but the length of which is several times the diameter of the fastening bolt. The fastening device 20 offers biaxial tolerance compensation, with regard to the position of the fastening projection assigned thereto, along two mutually perpendicular movement directions, as will likewise be discussed in more detail below. Correspondingly, in the example illustrated, the hole 15 assigned thereto in the base plate 12 has a substantially square cross section with rounded corners, wherein the width and the length of the hole 15 amount in each case to several times the diameter of the for example cylindrical fastening bolt assigned thereto.

FIG. 4 shows the fastening device 18 in an enlarged detail illustration. Said fastening device has a fastening element which comprises a housing part 22 and a fastening part 24. The housing part 22 has a substantially plate-like base portion 26, on which there is arranged a cylindrical portion with a central cylindrical hole 28. The fastening part 24 comprises two elastic arm portions 30, 32, which in the mounted state illustrated in FIGS. 4 to 8 are accommodated in corresponding receptacles of the cylindrical portion of the housing part 22. The upper sides and under sides of the elastic arm portions 30, 32 form in each case force transmission surfaces 34, 36 which, during the operation of the device, interact with corresponding force transmission surfaces 38, 40 of the housing part 22 (see FIG. 7). As can be seen in particular in FIG. 7, the force transmission surfaces 34, 36, 38, 40 are situated in each case at an angle relative to the insertion direction of the fastening projection, which in FIG. 7 runs vertically from bottom to top. In this way, a pulling force that acts on the fastening device during operation, that is to say from bottom to top in FIG. 7, generates a holding force which acts radially inward in relation to the cylindrical hole 28 of the housing part 22. In this way, with simple mounting, high holding forces are realized during operation. The design of the fastening element may in this respect correspond to the design described in WO 2015/065583 A1.

The cylindrical hole 28 defines a holding receptacle for the fastening projection. In the cylindrical hole 28, there are provided latching means, in the present example an internal thread 42 (see FIG. 14). The fastening projection, which is for example in the form of a cylindrical fastening bolt with an external thread, latches on said internal thread 42 during operation and is thereby held in the holding receptacle. On the underside of the base portion 26 of the housing part 22 there are formed two parallel teeth rows 44, which can be seen in FIG. 6. The teeth rows 44 form positive-locking elements and comprise in each case a multiplicity of parallel-running teeth, which in the present case run perpendicular to the longitudinal direction of the teeth rows 44. At two opposite sides, the base portion 26 has in each case one right-angled collar portion 46. The collar portions 46 each have a central cutout 48 into which, in each case proceeding from opposite ends of the cutout 48, two elastic holding arms 50 extend toward one another. The holding arms 50 which extend toward one another extend substantially over the entire width of the cutout 48, aside from a small spacing between their free ends, and are situated opposite in each case one of the teeth rows 44 with a spacing. An elongate projection 52 extends centrally between the teeth rows 44, centrally through which projection the cylindrical hole 28 runs. As can also be seen in FIG. 6, the cylindrical hole 28 that forms the holding receptacle has a centering opening 54 which tapers in portions in the insertion direction of the fastening projection, that is to say from bottom to top in FIG. 6.

It can be seen in particular in FIG. 4 that, on the base plate 12, in the region of the arrangement of the fastening device 18, there are likewise formed two elongate collar portions 56, which are accommodated in each case in the free space formed by the collar portions 46 of the housing part 26 or of the spacing between the holding arms 50 and the teeth rows 44. On the upper side of the collar-like portions 56 of the base plate 12 there are formed two teeth rows which correspond to the teeth rows 44 of the fastening element and which likewise form positive-locking elements and which, in FIG. 8, are indicated at the reference designation 58. In the premounted position of the fastening element as shown in FIG. 4, the teeth rows 44 and the teeth rows 58 engage into one another in a positively locking manner, as can also be seen in the side view of FIG. 7, which likewise shows said premounted position. In FIG. 7, it can furthermore be seen that the elastic holding arms 50, owing to their prestress, push the collar portion 56 of the base plate 12 from below against the underside of the housing part 26 of the fastening element, and thus place the teeth rows 44 and 58 in positive engagement.

The function of the fastening device 18, in particular the uniaxial tolerance compensation thereof, will be discussed below. The component 10 is mounted with the holes 13, 14, 15 and the premounted fastening devices 16, 18 and 20 onto the three fastening projections of the carrier component. The fastening projection guided through the hole 13 is in this case fastened in a predefined position by means of the fastening device 16. Owing to position tolerances, it is possible that the fastening projections guided through the holes 14 and 15 are not optimally centered in relation to the respective hole 14, 15 or the holding receptacle of the fastening element 18, 20 respectively provided for said fastening projections. For example, it is possible for the fastening projection to be arranged in the hole 14 so as to be laterally offset with respect to the hole center. In the course of the insertion of the fastening projection into the fastening device 18, said fastening projection correspondingly abuts against the tapering surface of the centering opening 54. If the fastening projection is now pushed further against said conically tapering surface of the centering opening 54, the fastening element is lifted upward from the base plate 12 of the component 10 into the position shown in FIG. 8. The clear width between the free ends of the collar-like portions 46 and the opposite upper side of the plate-like base portion 26 is correspondingly greater than the thickness of the collar-like portions 56. During said lifting of the fastening element, the teeth rows 44, 58 pass out of engagement, with elastic deformation of the holding arms 50 counter to their prestress. The positive locking, which previously prevented a movement of the fastening element relative to the base plate 12 of the component 10 in the longitudinal direction of the teeth rows 44, 58 (the first movement direction), is now eliminated, and the fastening element can be moved laterally along the longitudinal axis of the teeth rows 44, 58, wherein the fastening projection is automatically centered relative to the hole 14 and thus relative to the cylindrical hole 28, which forms the holding receptacle, of the fastening element. After said centering, the holding arms 50 can place the now correspondingly laterally offset teeth rows 44, 58 into positive engagement again.

Below, on the basis of FIGS. 9 to 21, it is the intention to discuss the fastening device 20 which permits biaxial tolerance compensation, and the function thereof during the placement of the component 10 onto the fastening projections of the carrier component. With regard to the tolerance compensation in the first movement direction, said fastening device 20 substantially corresponds to the fastening device 18 discussed above. By contrast to the fastening device 18, the fastening device 20 however furthermore has an intermediate element 60 which is shown in FIGS. 12 and 13 and which is arranged between the fastening element and the base plate 12 of the component 10. Said intermediate element 60 promotes tolerance compensation along a second axis or second direction of movement which runs perpendicular to the first movement direction. For this purpose, the base plate 12 is likewise adapted in a particular way, as will likewise be discussed in more detail below.

The fastening element shown in particular in FIGS. 5 and 6 is also used in the fastening device 20. By contrast to the fastening device 18, it is however the case in the fastening device 20 that the fastening element interacts with the intermediate element 60. The intermediate element 60 comprises a base portion 62 with a hole 64 corresponding to the hole 14. On both sides of the base portion 62, there are formed collar portions 66 which correspond in terms of their shape to the collar portions 56 of the base plate 12 of the component 10 (see FIG. 4). In turn, on the upper side of the collar portions 66, there is formed in each case one teeth row 68 with a multiplicity of parallel teeth. The teeth rows 68, which in turn form positive-locking elements, also correspond in this respect to the teeth rows 58 of the base plate 12, as discussed above with regard to the fastening device 18. As can be seen in FIG. 13, on the underside of the intermediate element 60, there are formed two further parallel teeth rows 70, which each have a multiplicity of parallel teeth, in particular running perpendicular to the longitudinal direction of the teeth rows 70, and which likewise form positive-locking elements.

It can also be seen in FIG. 13 that the underside of the hole 64 has a centering opening 72 which tapers in portions in the insertion direction of the fastening projection, from top to bottom in FIG. 13. Two teeth rows 74 which correspond to the teeth rows 70 are formed on the base plate 12 of the component 10 in the region of the fastening device 20 and likewise form positive-locking elements, as can be seen in particular in FIG. 11. The hole 15, which can also be seen in FIG. 3, is arranged between the teeth rows 74. The teeth rows 74 are situated in each case between the hole 15 and outer right-angled collar portions 76, on which, in turn, there are arranged in each case two elastic holding arms 78 which extend toward one another proceeding from opposite sides of a cutout of the collar portions 76. In turn, the elastic holding arms 78 extend substantially over the entire length of the cutouts of the collar portions 76 aside from a small spacing between the free ends of the holding arms 78. At opposite ends of the intermediate element 60, there are formed further collar portions 80, which in the mounted state interact in positively locking fashion with the collar portions 76, wherein the elastic holding arms 78 push the intermediate element 60 downward in the direction of the base plate 12 of the component 10 and thereby place the teeth rows 70 and 74 in positive engagement. Furthermore, the fastening element is, in the manner basically discussed above with regard to the fastening device 18, pushed against the intermediate element 60 by the elastic holding arms 50 which engage under the collar portions 66 of the intermediate element 60, whereby the teeth rows 44 of the fastening element and 68 of the intermediate element 60 come into positive engagement with one another. In this premounted position, a movement of the fastening element relative to the component 10 is prevented both in the longitudinal direction of the teeth rows 44, 68 and in the longitudinal direction, running perpendicular thereto, of the teeth rows 70, 74.

The mounting of the fastening device 20 on a fastening projection, for example a cylindrical fastening bolt, as occurs in the course of the placing of the component 10 onto the fastening projections of the carrier component, will be discussed on the basis of FIGS. 14 to 21. A cylindrical fastening bolt of said type is shown by way of example at the reference designation 82 in FIGS. 14 to 21. Said cylindrical fastening bolt is connected to the carrier component 84, for example by welding or adhesive bonding, and has an external thread which, in the mounted state, latches in the internal thread 42 of the holes 28 which form the holding receptacles.

FIGS. 14 and 15 show the start of the mounting of the fastening device 20 on the fastening bolt 82. Here, the fastening bolt 82 initially abuts against the conically tapering centering opening 72 of the intermediate element 60. As a result of the fastening bolt 82 being pushed in further, the centering element 60, and together with this the fastening element arranged thereon, is lifted from the base plate 12 of the component 10, wherein the teeth rows 74, 70 are released from their positive locking. Now, as already basically discussed above with regard to the fastening device 18, centering of the fastening bolt 82 in relation to the hole 28 which forms the holding receptacle is realized along the longitudinal axis of the teeth rows 74, 70, as shown by FIGS. 16 and 17, until the position shown in FIGS. 18 and 19 is attained. From a comparison of FIGS. 14, 16 and 18, the lateral displacement of the intermediate element 60 together with the fastening element along the longitudinal axis of the teeth rows 70 and 74 (second movement direction) can be clearly seen. After completion of the centering along the longitudinal direction of the teeth rows 70, 74, the holding arms 78 of the component 10 push the intermediate element 60, and together with the latter the fastening element, downward again, such that the teeth rows 70, 74 come into positive engagement again.

At the same time, the fastening bolt 82 now abuts against the conically tapering centering opening 54 of the fastening element, as can be seen in FIG. 19. Now, as a result of the fastening bolt 82 being pushed in further, centering of the fastening bolt 82 in the longitudinal direction of the teeth rows 44 of the fastening element and 68 of the intermediate element 60 (first movement direction) is realized, as basically discussed above with regard to the fastening device 18.

In particular, proceeding from FIG. 19, as a result of the fastening bolt 82 being pushed in further, it is initially the case that the positive locking between the teeth rows 44, 68 is eliminated as a result of the fastening element being lifted from the intermediate element 60 counter to the prestress of the holding arms 50, and subsequently, the fastening bolt 82 is centered relative to the hole 28, with relative displacement of the fastening element with respect to the intermediate element 60. After the centering process, the holding arms 50 push the teeth rows 44, 68 into positive engagement with one another again until the fully mounted position illustrated in FIGS. 20 and 21 is attained.

Thus, during the insertion of the fastening bolt 82, it is firstly the case that the positive locking of a pair of teeth rows is eliminated for the centering in the longitudinal direction of said teeth rows, and subsequently, the positive locking between the other pair of teeth rows is eliminated for the centering in the longitudinal direction of said teeth rows. Here, owing to the teeth rows that are respectively in positive engagement, and the collar sections, it is ensured that a relative movement of the components can occur in each case only along the movement axis allowed at that time by the suppressed positive locking.

A further exemplary embodiment of a fastening device according to the invention, which permits uniaxial tolerance compensation, will be discussed on the basis of FIGS. 22 to 25. The fastening device comprises a housing part 86, which is provided on a component 10' to be fastened to a carrier component (not illustrated in any more detail) and which has an elongate hole 88 for a fastening projection 90 which can be partially seen in FIG. 22. The housing part receives a bracket-shaped fastening part 92 which is elastic at least in sections. The fastening part 92 comprises two bracket arms 96 which extend proceeding from a base portion 94, the upper sides 98 and undersides 100 of which bracket arms form force transmission surfaces which run in each case at an angle with respect to the insertion direction of the fastening projection 90. Said force transmission surfaces interact, in the mounted state shown in FIG. 22, with their respectively associated force transmission surfaces of the housing part 86, which are likewise oriented at an angle with respect to the insertion direction of the fastening projection 90, in the manner basically discussed above. At the reference designation 102, an internal thread of the fastening part 92 is shown which, in the mounted state, latches on an external thread of the fastening projection 90 and forms a holding receptacle for the fastening projection 90. Furthermore, proceeding from the base portion 94, there extends an insertion section 104 which has a hole 106 adapted to the outer diameter of the fastening projection 90. As can be seen in particular in the view from below in FIG. 23 and in FIG. 25, the hole 106 has a frustoconically tapering centering opening 108. In the illustrated example, two elastic teeth arms 110 extend substantially tangentially relative to that portion of the insertion portion 104 which delimits the hole 106 with the centering opening 108, at the free ends of which teeth arms there is arranged in each case one tooth 112. The teeth 112 are in each case in engagement with a teeth row 114, with a multiplicity of teeth, formed on the component 10'.

If the fastening projection 90 is inserted into the fastening part 92, and if the fastening projection is not centered relative to the hole 106, said fastening projection initially abuts against the frustoconically tapering centering opening 108. The further pressure during the insertion of the fastening projection 90 causes the fastening part 102 to then be displaced substantially in the longitudinal direction of the teeth rows 114, to the left or right in FIG. 23, wherein initially, with elastic deformation of the teeth arms 110, the positive locking between the teeth 112 and the teeth rows 114 is eliminated, and wherein the teeth 112 latch in positively locking fashion in the respectively associated teeth row 114 again after the end position of the fastening part 92 is reached.

The fastening devices shown in the figures permit tolerance compensation as a result of movement in each case in both directions along the respective movement direction predefined by the teeth rows. Therefore, the fastening devices are expediently premounted centrally relative to the respective teeth rows.

With the fastening devices or systems according to the invention shown in the figures, it is possible for position tolerances of the fastening projections on the carrier components to be compensated in a simple manner in terms of production and mounting, wherein, at all times, a defined position of the components of the fastening devices is realized, and a high holding force is achieved during operation.

The invention claimed is:

1. A system, comprising: a component and a fastening device for fastening the component on a fastening projection of a carrier component, wherein the fastening device comprises a fastening element with a holding receptacle for the fastening projection, and wherein the holding receptacle has holding means which are designed to hold the fastening projection, which is guided through a hole in the component, in the holding receptacle, wherein the fastening element has positive-locking elements, wherein the component or an intermediate element arranged on the component has positive-locking elements corresponding to the positive-locking elements of the fastening element, wherein prestressing means are provided which prestress the mutually corresponding positive-locking elements into positive engagement in a premounted position of the fastening element on the component, such that a lateral displacement of the fastening element relative to the component along a first direction of movement is prevented, and the holding receptacle of the fastening element has a centering opening at least partially tapering in an insertion direction of the fastening projection, against which centering opening the fastening projection of the carrier component strikes during insertion into the holding receptacle, and by means of which centering opening the fastening projection is centered with respect to the holding receptacle of the fastening element with temporary suppression of the positive locking of the mutually corresponding positive-locking elements and with lateral displacement of the fastening element along the first direction of movement;
wherein the prestressing means are formed by elastic holding arms which are formed on the fastening element and which press the mutually corresponding positive-locking elements into positive engagement with one another.

2. The system as claimed in claim 1, wherein, with the fastening projection accommodated in the holding receptacle, the corresponding positive-locking elements come into positive engagement again by virtue of the prestressing means.

3. The system as claimed in claim 2 wherein, as a result of the interaction of the fastening projection with the centering opening of the holding receptacle, the fastening element is lifted from the component and consequently the positive locking of the mutually corresponding positive-locking elements is suppressed.

4. The system as claimed in claim 2, wherein the mutually corresponding positive-locking elements are formed by a toothing of the fastening element and a toothing of the component or of the intermediate element arranged on the component.

5. The system as claimed in claim 4, wherein the fastening element has, on its underside facing the component, at least one teeth row with a plurality of teeth, and in that the component or the intermediate element arranged on the component has, on its upper side facing the fastening element, likewise at least one teeth row with a plurality of teeth, wherein the teeth rows of the fastening element and of the component or of the intermediate element arranged on the component can come into positive engagement with one another in different positions along the first direction of movement.

6. The system as claimed in claim 1, wherein arresting means are provided which prevent a movement of the fastening element relative to the component or to the intermediate element arranged on the component in another direction than along the first direction of movement.

7. The system as claimed in claim 6, wherein the arresting means are formed by collar portions of the fastening element and of the component or of the intermediate element arranged on the component, which collar portions are in engagement with one another.

8. The system as claimed in claim 1, wherein:
the positive-locking elements corresponding to the positive-locking elements of the fastening element are formed on an upper side, which faces the fastening element in the premounted position, of an intermediate element arranged on the component and having a hole for guiding through the fastening projection,
the intermediate element has further positive-locking elements on its underside facing away from the fastening element in the premounted position, wherein the component has, on its upper side facing the intermediate element, further positive-locking elements corresponding to the further positive-locking elements of the intermediate element,
further prestressing means are provided which prestress the mutually corresponding further positive-locking elements into positive engagement in a premounted position of the intermediate element on the component, with the result that a lateral displacement of the intermediate element relative to the component along a second direction of movement is prevented, and
the hole in the intermediate element has a further centering opening at least partially tapering in the insertion direction of the fastening projection, against which centering opening the fastening projection strikes in the course of insertion into the hole in the intermediate element, and by means of which centering opening the fastening projection is centered with respect to the holding receptacle of the fastening element with temporary suppression of the positive connection of the mutually corresponding further positive-locking elements and with lateral displacement of the intermediate element along the second direction of movement.

9. The system as claimed in claim 8, wherein the second direction of movement extends perpendicularly to the first direction of movement.

10. The system as claimed in claim 8, wherein, when the fastening projection strikes the centering opening of the holding receptacle of the fastening element, the further corresponding positive-locking elements come into positive engagement again by virtue of the further prestressing means.

11. The system as claimed in claim 8, wherein, as a result of the interaction of the fastening projection with the further centering opening of the intermediate element, the intermediate element is lifted jointly with the fastening element from the component and consequently the positive locking of the further mutually corresponding positive-locking elements is suppressed.

12. The system as claimed in claim 8, wherein the further mutually corresponding positive-locking elements are formed by a toothing of the intermediate element and a toothing of the component.

13. The system as claimed in claim 8, wherein the intermediate element has, on its underside facing the component, at least one teeth row with a plurality of teeth, and in that the component has, on its upper side facing the intermediate element, likewise at least one teeth row with a plurality of teeth, wherein the teeth rows of the intermediate element and of the component can come into positive engagement with one another in different positions along the second direction of movement.

14. The system as claimed in claim 8, wherein further arresting means are provided which prevent a movement of the intermediate element relative to the component in another direction than along the second direction of movement.

15. The system as claimed in claim 14, wherein the further arresting means are formed by collar portions of the intermediate element and of the component that are in engagement with one another.

16. The system as claimed in claim 8, wherein the further prestressing means are formed by elastic holding arms which are formed on the component and which press the further mutually corresponding positive-locking elements into positive engagement with one another.

17. A system, comprising: a component and a fastening device for fastening the component on a fastening projection of a carrier component, wherein the fastening device comprises a fastening element with a holding receptacle for the fastening projection, and wherein the holding receptacle has holding means which are designed to hold the fastening projection, which is guided through a hole in the component, in the holding receptacle, wherein the fastening element has positive-locking elements, wherein the component or an intermediate element arranged on the component has positive-locking elements corresponding to the positive-locking elements of the fastening element, wherein prestressing means are provided which prestress the mutually corresponding positive-locking elements into positive engagement in a premounted position of the fastening element on the component, such that a lateral displacement of the fastening element relative to the component along a first direction of movement is prevented, and the holding receptacle of the fastening element has a centering opening at least partially tapering in an insertion direction of the fastening projection, against which centering opening the fastening projection of the carrier component strikes during insertion into the holding receptacle, and by means of which centering opening the fastening projection is centered with respect to the holding receptacle of the fastening element with temporary suppression of the positive locking of the mutually corresponding positive-locking elements and with lateral displacement of the fastening element along the first direction of movement;

wherein the mutually corresponding positive-locking elements are formed by a toothing of the fastening element and a toothing of the component or of the intermediate element arranged on the component;

wherein, with the fastening projection accommodated in the holding receptacle, the corresponding positive-locking elements come into positive engagement again by virtue of the prestressing means;

wherein the fastening element has at least two elastic teeth arms with at least one tooth arranged on each end thereof, and in that the component or the intermediate element arranged on the component has at least two teeth rows with a plurality of teeth, wherein, with elastic deformation of the teeth arms, the teeth of the elastic teeth arms can come into positive engagement with in each case one of the teeth rows in different positions along the first direction of movement, wherein the elastic teeth arms are prestressed in the direction of the teeth row respectively assigned to them.

18. A system, comprising: a component and a fastening device for fastening the component on a fastening projection of a carrier component, wherein the fastening device comprises a fastening element with a holding receptacle for the fastening projection, and wherein the holding receptacle has holding means which are designed to hold the fastening projection, which is guided through a hole in the component, in the holding receptacle, wherein the fastening element has positive-locking elements, wherein the component or an intermediate element arranged on the component has positive-locking elements corresponding to the positive-locking elements of the fastening element, wherein prestressing means are provided which prestress the mutually corresponding positive-locking elements into positive engagement in a premounted position of the fastening element on the component, such that a lateral displacement of the fastening element relative to the component along a first direction of movement is prevented, and the holding receptacle of the fastening element has a centering opening at least partially tapering in an insertion direction of the fastening projection, against which centering opening the fastening projection of the carrier component strikes during insertion into the holding receptacle, and by means of which centering opening the fastening projection is centered with respect to the holding receptacle of the fastening element with temporary suppression of the positive locking of the mutually corresponding positive-locking elements and with lateral displacement of the fastening element along the first direction of movement;

wherein the holding means of the holding receptacle comprise latching means which are designed to latch with corresponding latching means of the fastening projection.

19. The system as claimed in claim 18, wherein the fastening element comprises an at least partially elastic fastening part which is accommodated by a housing part in a mounted state, wherein the latching means for latching on the fastening projection are formed on an inner wall, which delimits the holding receptacle, of the fastening part and/or of the housing part, and wherein the fastening part and the housing part each have at least one force transmission surface, wherein the force transmission surfaces face one another in the mounted state and transmit at least one operationally occurring pulling force, wherein the force transmission surfaces each lie in planes which are oblique or curved with respect to the insertion direction of the holding receptacle.

20. The system as claimed in claim 19, wherein the housing part forms a part of the fastening element, wherein the positive-locking elements are formed on the housing part.

21. The system as claimed in claim 19, wherein the housing part forms a part of the component.

* * * * *